J. BAKER.
DEMOUNTABLE RIM.
APPLICATION FILED JULY 21, 1910.
1,001,802.
Patented Aug. 29, 1911.
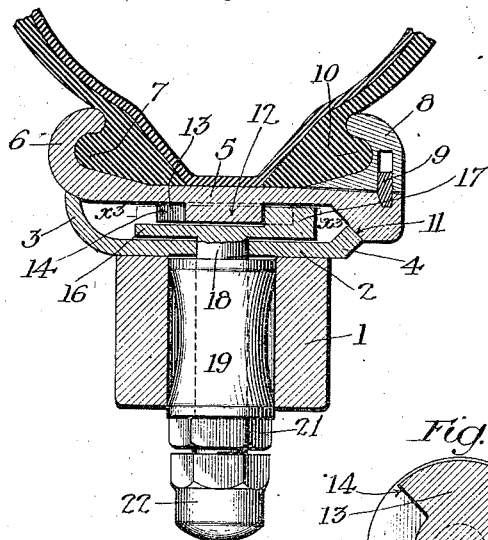
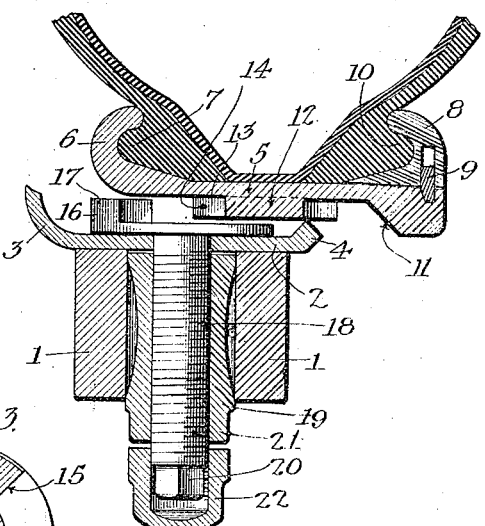
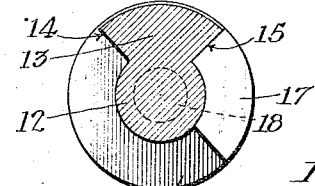
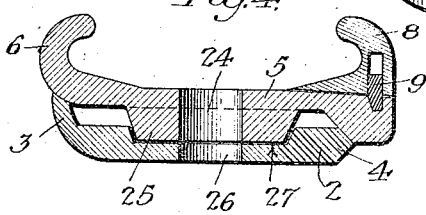
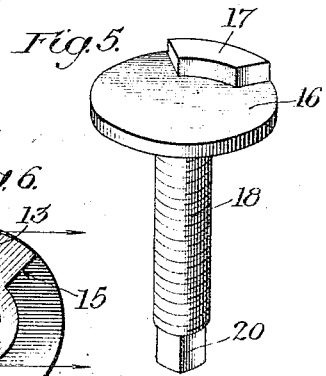
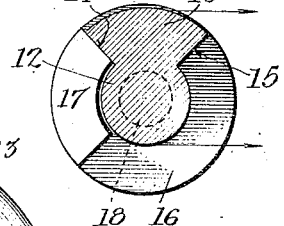
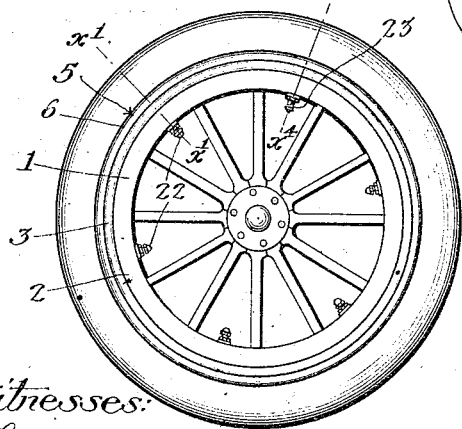
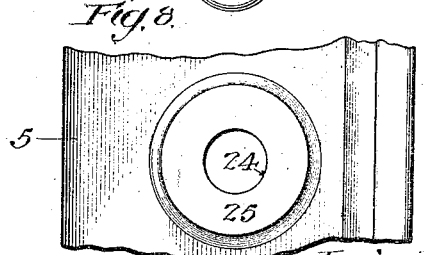
Witnesses:
Inventor
John Baker

UNITED STATES PATENT OFFICE.

JOHN BAKER, OF PASADENA, CALIFORNIA.

DEMOUNTABLE RIM.

1,001,802.  Specification of Letters Patent.  Patented Aug. 29, 1911.

Application filed July 21, 1910. Serial No. 573,108.

*To all whom it may concern:*

Be it known that I, JOHN BAKER, a citizen of the United States, residing at Pasadena, in the county of Los Angeles and State of California, have invented a new and useful Demountable Rim, of which the following is a specification.

This invention relates to demountable rims and has for its object to provide a construction for securing the demountable rim in place which will securely hold the demountable rim against lateral movement and also prevent it from circumferential movement, and a further object is to provide for a quick release of the demountable rim to enable its removal and to provide a quick locking thereof after it has been placed on the felly.

A further object of the invention is to provide a support adjacent to each edge of the demountable rim when it is in position and to so construct said edge supports that the demountable rim may be forced into close engagement therewith to secure a good fit, prevent rattle, and form a perfect seat.

Referring to the drawings: Figure 1 is a sectional view on an enlarged scale taken on line $x^1$—$x^1$ Fig. 7. Fig. 2 is a view similar to Fig. 1, showing the demountable rim released and partially removed. Fig. 3 is a section on line $x^3$—$x^3$ Fig. 1. Fig. 4 is a section through the valve stem portion of the rim on line $x^4$—$x^4$ Fig. 7. Fig. 5 is a perspective view of the revoluble locking device. Fig. 6 is a view similar to Fig. 3, showing the revoluble locking device turned into position to release the demountable rim, the arrows showing the direction in which the demountable rim is moved away from the locking device after having been released thereby. Fig. 7 is a side elevation of a wheel equipped with the invention. Fig. 8 is a plan view of that portion of the rim through which the valve stem extends.

1 designates the felly on which is rigidly secured the fixed rim 2, which on its inner edge is provided with an up-curved flange 3, the upper edge of the flange being inwardly beveled, as shown. The outer edge of the fixed rim 2 has an up-turned flange 4, the outer edge of which is beveled upwardly and inwardly, as shown.

5 designates the demountable rim which is formed on its inner edge with a recessed flange 6 to receive the bead 7 of the tire. A removable flange 8 is detachably secured to the outer portion of the demountable rim 5 in any desired manner as by the expansible ring 9, the outer removable flange 8 receiving the outer bead 10 of the tire. The full details of the construction of the removable retaining flange 8 and locking ring 9 are given in a former patent of mine No. 913,254, dated February 23, 1909, but it should be understood that the present invention is not restricted to any particular construction of the retaining flange 8, and it is not restricted to the removability or non-removability of the flange 8. It is sufficient for the purposes of the present invention that the demountable rim 5 be provided with some means for securing the tire thereto.

The demountable rim 5 on its outer edge is provided with a beveled abutment 11, which is adapted to seat against the beveled flange 4, while the curved portion of the flange 6 is adapted to seat against the beveled edge of the flange 3.

The demountable rim 5 is provided on its inner surface with a series of locking lugs 12, the contour of each of which is clearly outlined in Figs. 3 and 6. Each locking lug 12 comprises a circular portion, as shown, and has a lateral projecting segmental portion 13, thereby forming two abutments 14 and 15 which serve as stops to limit the turning movement of a rotatable locking device shown in detail in Fig. 5 and comprising a disk 16, on the upper face of which is a segmental lug 17, which lug is adapted to be revolved partly around the segmental portion 13, so that it will occupy either the position shown in Fig. 3 or the position shown in Fig. 6, the abutment 15 serving as a stop to limit its movement into the position shown in Fig. 3 and the abutment 14 serving as a stop to limit its movement into the position shown in Fig. 6. The disk 16 is carried on the end of a screw 18 which projects rotatably through the fixed rim 2 and is screwed in a nut 19 which lies in a recess in the felly 1. The lower end of the screw 18 has a squared end 20 to receive a wrench or key for turning it. That portion of the nut 19 which projects from the felly 1 is formed with a hexagonal portion 21 to receive a wrench, while the cap 22 is screwed on the end of the screw 18 to act as a lock nut to prevent the nut 19 from loosening and to also cover and finish the end of the screw 18. There may be as many of these locking devices as desired, for example, one may be located in every other space between spokes, but where the valve stem 23 lies the demountable rim will be constructed as shown in Figs. 4 and 8, the demountable rim at this particular point only being provided with a radial bore 24 through which the valve stem passes, and on its inner face the demountable rim is formed with an annular boss 25 which encircles the bore 24. The fixed rim 2 at this point is provided with a bore 26 which registers with the bore 24 to receive the valve stem and formed annularly around the bore 26 is a recess 27 with beveled walls to receive the boss 25, the latter also having beveled walls, as shown.

The demountable rim is secured in position by the lugs 17 which bear against the outer faces of the locking lugs 12 and the segmental portions 13, as shown in Figs. 1 and 3, the flange 6 and beveled portion 11 of the demountable rim being respectively securely seated against the beveled edges of the flanges 3 and 4, the nuts 19 being securely tightened against the inner face of the fixed rim 2 to prevent the disk 16 from turning and the nuts 19 being locked against loosening by means of the caps 22.

When it is desired to remove the demountable rim, the caps 22 are first removed, then the nuts 19 are loosened and then each screw 18 is turned one-half around, which will move its locking lug 17 from the position shown in Figs. 1 and 3 to the position shown in Figs. 2 and 6. There is no difficulty in determining the exact amount of rotation to be imparted to the screws 18, because the abutments 14 will act to positively stop the lugs 17 when they arrive at the correct unlocking position; thus, it is only necessary to turn the screws 20 as far as they will go. This will place all of the lugs 17 in the position shown in Fig. 6, whereupon the demountable rim may be removed from the fixed rim in the direction indicated by the arrows in Fig. 6, and as illustrated in Fig. 2. It should be noted that in removing the demountable rim, that portion adjacent the valve stem is not slid from the fixed rim first but the opposite portion of the demountable rim is first swung outward, during which time the boss 25 remains seated in the seat 27 in the fixed rim, but as soon as the demountable rim has been swung out sufficiently to clear the fixed rim, then the demountable rim is moved radially with respect to the fixed rim in a direction to withdraw the boss 25 from its seat 27. In replacing the demountable rim, that portion of it having the boss 25 is first inserted, the boss 25 entering the recess 27, and then the demountable rim swung inwardly and slipped into place. After which, all of the screws 18 are turned one-half around which will bring the lugs 17 into position shown in Fig. 3. In turning the screws 18 into locking position, they should be turned as far as possible which will result in the lugs 17 acting against the inclined abutments 15 to force the locking lugs 12 inward, so that the demountable rim will be crowded inward and firmly seated on the beveled edges of the flanges 3 and 4. After the screws 18 have been thus turned, the nuts 19 are tightened and the caps 22 applied. The lugs 17, being curved and fitting the circular segmental portions 13, prevent the demountable rim from circumferential movement. This is further prevented by the boss 25 which is seated in the recess 27.

What I claim is:

1. A fixed rim, a demountable rim thereon, a plurality of eccentric locking lugs rotatably mounted on the fixed rim, and a series of fixed lugs on the demountable rim located concentric with the axes of the rotatable lugs, whereby said rotatable lugs may be moved into positions on either side of the fixed lugs on the demountable rim to either lock or unlock the demountable rim.

2. A fixed rim provided with beveled seats at each edge thereof, a demountable rim formed with beveled faces slanting substantially in the same direction adapted to respectively fit the said seats, the demountable rim being provided on its inner surface with a series of locking lugs, and a series of rotatable lugs mounted on the fixed rim and operable into an eccentric position at one side or the other of the locking lugs on the demountable rim.

3. A fixed rim, a demountable rim therefor, a series of locking lugs on the inner surface of the demountable rim circular in form with segmental lateral projections forming stops, a series of locking lugs rotatably mounted on the fixed rim, each rotatable lug being operable into a position at either side of its associated lug on the demountable rim, the said rotatable lug being limited in its movement in either direction by the said segmental projection on the associated lug.

4. A fixed rim, a demountable rim therefor, a series of locking lugs on the inner face of the demountable rim, each of said lugs being circular, a series of lugs rotatably mounted on the fixed rim eccentric to the respective lugs on the demountable rim, each rotatable lug on the fixed rim having a concave surface which receives a lug on the demountable rim and thereby prevents circumferential movement of the demountable rim, at the same time preventing lateral displacement of the demountable rim.

5. A fixed rim, a demountable rim therefor, a series of screws rotatable in the fixed rim, a series of nuts on said screws tightened against the fixed rim to prevent rotation of the screws, a series of disks carried by said screws, each disk being formed with a segmental locking lug, a series of lugs on the demountable rim each provided with a segmental lateral projection coacting with the associated rotatable lug to detachably secure the demountable rim in position.

6. A felly, a fixed rim thereon, a demountable rim removable from the fixed rim, a series of screws rotatable in the fixed rim and passing through the felly, the felly having nut receiving recesses around each screw, nuts in said recesses on the respective screws, a disk on each screw, a locking lug carried by each disk, and lugs on the demountable rim adapted to coact with the lugs on the disk for detachably retaining the demountable rim.

In testimony whereof, I have hereunto set my hand at Los Angeles, California, this 15th day of July, 1910.

JOHN BAKER.

In presence of—
G. T. HACKLEY,
FRANK L. A. GRAHAM.

Copies of this patent may be obtained for five cents each, by addressing the "Commissioner of Patents, Washington, D. C."